(12) United States Patent
Tokimoto

(10) Patent No.: US 10,009,539 B2
(45) Date of Patent: Jun. 26, 2018

(54) IMAGE PROCESSING APPARATUS, IMAGE PROCESSING METHOD, AND PROGRAM

(71) Applicant: Sony Corporation, Tokyo (JP)

(72) Inventor: Arito Tokimoto, Tokyo (JP)

(73) Assignee: Sony Corporation (JP)

( * ) Notice: Subject to any disclaimer, the term of this patent is extended or adjusted under 35 U.S.C. 154(b) by 58 days.

(21) Appl. No.: 14/012,393

(22) Filed: Aug. 28, 2013

(65) Prior Publication Data
US 2014/0063280 A1    Mar. 6, 2014

(30) Foreign Application Priority Data

Sep. 6, 2012 (JP) ................................ 2012-196682

(51) Int. Cl.
| | |
|---|---|
| H04N 5/232 | (2006.01) |
| G06K 9/00 | (2006.01) |
| H04N 1/00 | (2006.01) |
| H04N 101/00 | (2006.01) |

(52) U.S. Cl.
CPC ..... *H04N 5/23229* (2013.01); *G06K 9/00221* (2013.01); *H04N 1/00336* (2013.01); *H04N 5/23245* (2013.01); *H04N 1/00156* (2013.01); *H04N 2101/00* (2013.01); *H04N 2201/0084* (2013.01)

(58) Field of Classification Search
CPC ........ G06F 17/30247; G06F 17/30047; H04N 2101/00; H04N 5/23219; H04N 9/7921; H04N 1/00156; H04N 1/00336; H04N 7/181

USPC ................... 348/208.14, 222.1, 231.2, 231.3
See application file for complete search history.

(56) References Cited

U.S. PATENT DOCUMENTS

| | | | |
|---|---|---|---|
| 7,778,927 B2 | 8/2010 | Kawakami | |
| 7,873,208 B2* | 1/2011 | Hamanaka | ......... G06K 9/00288 382/118 |
| 8,116,537 B2* | 2/2012 | Date | ................. G06F 17/30247 382/118 |
| 8,269,857 B2* | 9/2012 | Ishizaka | ..................... 348/231.2 |
| 2008/0226140 A1 | 9/2008 | Okamura | |
| 2009/0073285 A1* | 3/2009 | Terashima | ............... 348/231.99 |

(Continued)

FOREIGN PATENT DOCUMENTS

| | | |
|---|---|---|
| CN | 101266649 A | 9/2008 |
| CN | 101645089 A | 2/2010 |
| JP | 2006-059331 A | 3/2006 |

OTHER PUBLICATIONS

Chinese Office Action for Application No. 201310384448.3, dated Feb. 24, 2017.

(Continued)

*Primary Examiner* — Padma Haliyur
(74) *Attorney, Agent, or Firm* — Lerner, David, Littenberg, Krumholz & Mentlik, LLP

(57) ABSTRACT

An image processing apparatus including: an imaging section; an image storage section configured to store a captured image obtained by capturing an image by the imaging section; an object selection section configured to select an object from the captured image obtained by capturing the image by the imaging section; and an image extraction section configured to extract a captured image in accordance with the object selected from the stored captured image.

13 Claims, 10 Drawing Sheets

(56) References Cited

U.S. PATENT DOCUMENTS

2009/0297041 A1* 12/2009 Nagamine ................. G06T 7/73
382/209

OTHER PUBLICATIONS

Chinese Office Action for Application No. 201310384448.3, dated Oct. 16, 2017.

* cited by examiner

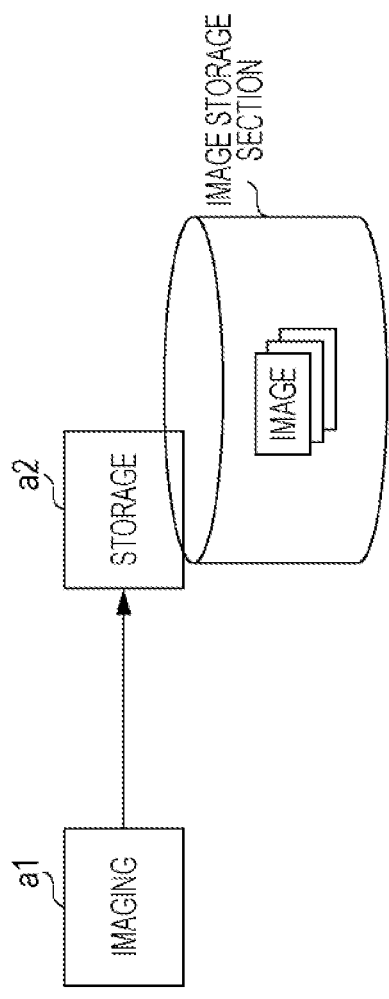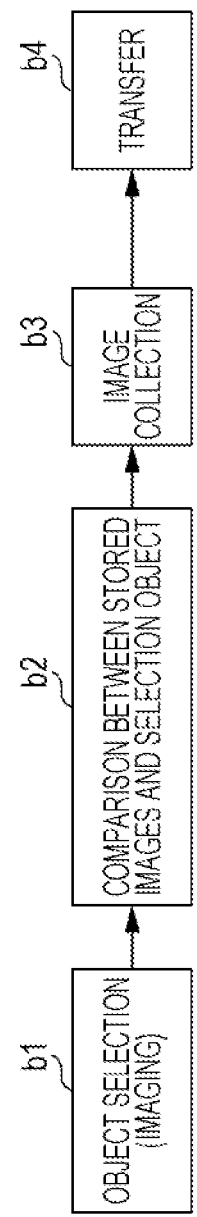

FIG. 3A

IN THE CASE OF ONE OBJECT AT SELECTION TIME

| MODE1 | COLLECT IMAGES INCLUDING THE OBJECT |
|---|---|
| MODE2 | COLLECT IMAGES NOT INCLUDING THE OBJECT |

FIG. 3B

IN THE CASE OF TWO OBJECTS AT SELECTION TIME

| MODE1 | COLLECT IMAGES INCLUDING BOTH OF THE TWO OBJECTS |
|---|---|
| MODE2 | COLLECT IMAGES INCLUDING AT LEAST ONE OF THE TWO OBJECTS |
| MODE3 | COLLECT IMAGES INCLUDING NEITHER OF THE TWO OBJECTS |

IMAGE PROCESSING APPARATUS, IMAGE PROCESSING METHOD, AND PROGRAM

BACKGROUND

The present technique relates to an image processing apparatus, an image processing method, and a program. In particular, the present technique relates to an image processing apparatus, and so on, which makes it possible to easily obtain a captured image including an object, such as a face of a specific person, and so on, from a plurality of captured images.

In recent years, techniques have been achieved for exchanging an image (image data) captured by an imaging apparatus, for example, a digital camera, a video camera, and so on, between a plurality of cameras. In such an exchange of images, images are transferred between imaging apparatuses through a server or directly between the imaging apparatuses through a wired/wireless communication connection.

For example, as an example of a technique for exchanging image data, Japanese Unexamined Patent Application Publication No. 2006-059331 has disclosed a method of exchanging images, in which images are transmitted together with identification information to a server, and images corresponding to the identification information recorded for each user are distributed by the server. In this method of exchanging images, the user records identification information in the server in advance, and when an image having identification information corresponding to the recorded identification information is uploaded, the server distributes this image data to the relevant users. Accordingly, this method of exchanging images is used in a mode in which an image capture group including a plurality of cameras records common identification information, and shares image data on the basis of the identification information.

SUMMARY

For a purpose of exchanging images, for example, captured images including an object, such as a face of a specific person, and so on, are sometimes requested to be obtained. However, in the method of exchanging images, which is described in Japanese Unexamined Patent Application Publication No. 2006-059331, an object, such as a face of a specific person, and so on included in the captured image is not identified, and thus a camera of an image capture group transmits image data of all the images captured by the camera to a server, and image data of all the images captured by the other cameras are received from the server, and are stored. And it is necessary for the camera of the image capture group to determine whether each data of all the images shared by the image capture group is desired image data or not in order to obtain images including an object, such as a face of a specific person, and so on, and to delete unnecessary image data.

It is desirable to reduce time and effort of user's operation when the user obtains a captured image including an object, such as a face of a specific person, and so on from a plurality of captured images.

According to an embodiment of the present technique, there is provided an image processing apparatus including: an imaging section; an image storage section configured to store a captured image obtained by capturing an image by the imaging section; an object selection section configured to select an object from the captured image obtained by capturing the image by the imaging section; and an image extraction section configured to extract a captured image in accordance with the object selected from the stored captured image.

In the present technique, the image storage section stores a captured image obtained by the imaging section. Also, the object selection section selects an object, for example, a face of a person from the captured image obtained by the imaging section. And the image extraction section extracts a captured image in accordance with the selected object from the stored captured images.

For example, the image extraction section may be configured to extract a captured image including all of or a part of the selected objects, or including none of the selected objects from the stored captured images on the basis of a mode setting. In this case, it becomes possible to change a captured image to be extracted depending on the mode setting.

Also, for example, the image extraction section may be configured to compare the selected object with the stored captured image, identify whether the object is included in the captured image or not, and extract the captured image in accordance with the selected object from the stored captured images. Here, a captured image to be extracted is, for example, a captured image including all of or a part of the selected object, or a captured image including none of the selected objects.

Also, for example, the information processing apparatus may further include an object recording section configured to record a predetermined number of objects on the basis of the captured image obtained by capturing the image by the imaging section, wherein the image storage section may be configured to compare the captured image obtained by capturing the image by the imaging section with the predetermined number of objects recorded, identify whether the captured image includes each object, and store the captured image with identification information, and the image extraction section may be configured to compare the selected object with the predetermined number of objects recorded, identify whether the selected object is any one of the predetermined number of objects recorded or whether the selected object is none of the predetermined number of objects recorded, and extract the captured image in accordance with the selected object from the captured images stored with the identification information. In this case, the captured images stored in the image storage section are stored in association with the identification information, and thus it becomes easy to perform processing at the time of extracting a captured image in accordance with the selected object.

In this manner, in the present technique, an object is selected from the captured image obtained by the imaging section, and captured images in accordance with the selected object are extracted from captured images stored in the image storage section. In this case, it is necessary for the user only to capture an image including the object, and thus user operation becomes easy to obtain captured images including the object, such as a face of a specific person, and so on.

In this regard, in the present technique, for example, the information processing apparatus may further include an image transfer section configured to transfer the extracted captured image to an external device. Thereby, it becomes possible to transfer only a captured image including the object, such as a face of a specific person, and so on, to the external device. And in this case, for example, when a transfer operation is performed, the object selection section may be configured to select the object from the captured image obtained by capturing the image by the imaging section immediately before the transfer operation. In this case, it is not necessary for the user to perform image capture operation to obtain a captured image for selecting the object after transfer operation, and thus the processing becomes easy.

Also, according to another embodiment of the present technique, there is provided an image processing apparatus including: an image acquisition section configured to acquire a captured image; an image storage section configured to store the captured image acquired; an object selection section configured to select an object from the acquired image; and an image extraction section configured to extract a captured image in accordance with the object selected from the stored captured image.

In the present technique, the image acquisition section obtains a captured image. For example, the image acquisition section may be configured to receive the captured image from an external device through a network. Also, for example, the image acquisition section may be an imaging section, or an input section of an imaging signal output from a camera, and so on. The object selection section selects an object, for example, a face of a person, from a captured image obtained by the image acquisition section. And the image extraction section extracts a captured image in accordance with the selected object from the stored captured images.

In this manner, in the present technique, an object is selected from the captured image obtained by the image acquisition section, and a captured image in accordance with the selected object is extracted from the captured images stored in the image storage section. Accordingly, it becomes possible to easily obtain a captured image including an object, such as a face of a specific person. In this regard, in the present technique, for example, the information processing apparatus may further include an image transfer section configured to transfer the extracted captured image to an external device. Thereby, it becomes possible to transfer only a captured image including an object, such as a face of a specific person, and so on to an external device.

Also, according to another embodiment of the present technique, there is provided an image processing apparatus including: an image acquisition section configured to acquire a captured image; an object recording section configured to record a predetermined number of objects on the basis of the captured image acquired; and an image storage section configured to compare the captured image acquired with the predetermined number of objects recorded, identify whether the captured image includes each object, and store the captured image with identification information.

In the present technique, the image acquisition section obtains a captured image. For example, the image acquisition section may be configured to receive the captured image from an external device through a network. Also, for example, the image acquisition section may be an imaging section, or an input section of an imaging signal output from a camera, and so on.

The object recording section records a predetermined number of objects, for example, faces of persons from the captured images obtained by the image acquisition section. And the image storage section compares the obtained captured image with a predetermined number of the recorded objects, identifies whether this captured image includes each object or not, and stores the captured image together with identification information.

In this manner, in the present technique, the image storage section stores individual images obtained by the image acquisition section, which have been classified depending on whether a certain object is included or not. Accordingly, it becomes easy to extract a captured image including a specific object or not including the specific object.

By the present technique, it is possible to reduce time and effort of user's operation when the user obtains a captured image including an object, such as a face of a specific person, and so on from a plurality of captured images.

BRIEF DESCRIPTION OF THE DRAWINGS

FIGS. 2A and 2B are diagrams for illustrating an example (first pattern) of image transfer processing in a camera;

FIGS. 3A and 3B are diagrams illustrating an example of corresponding relationships between mode settings and image collection patterns;

DETAILED DESCRIPTION OF EMBODIMENTS

Figure 1:
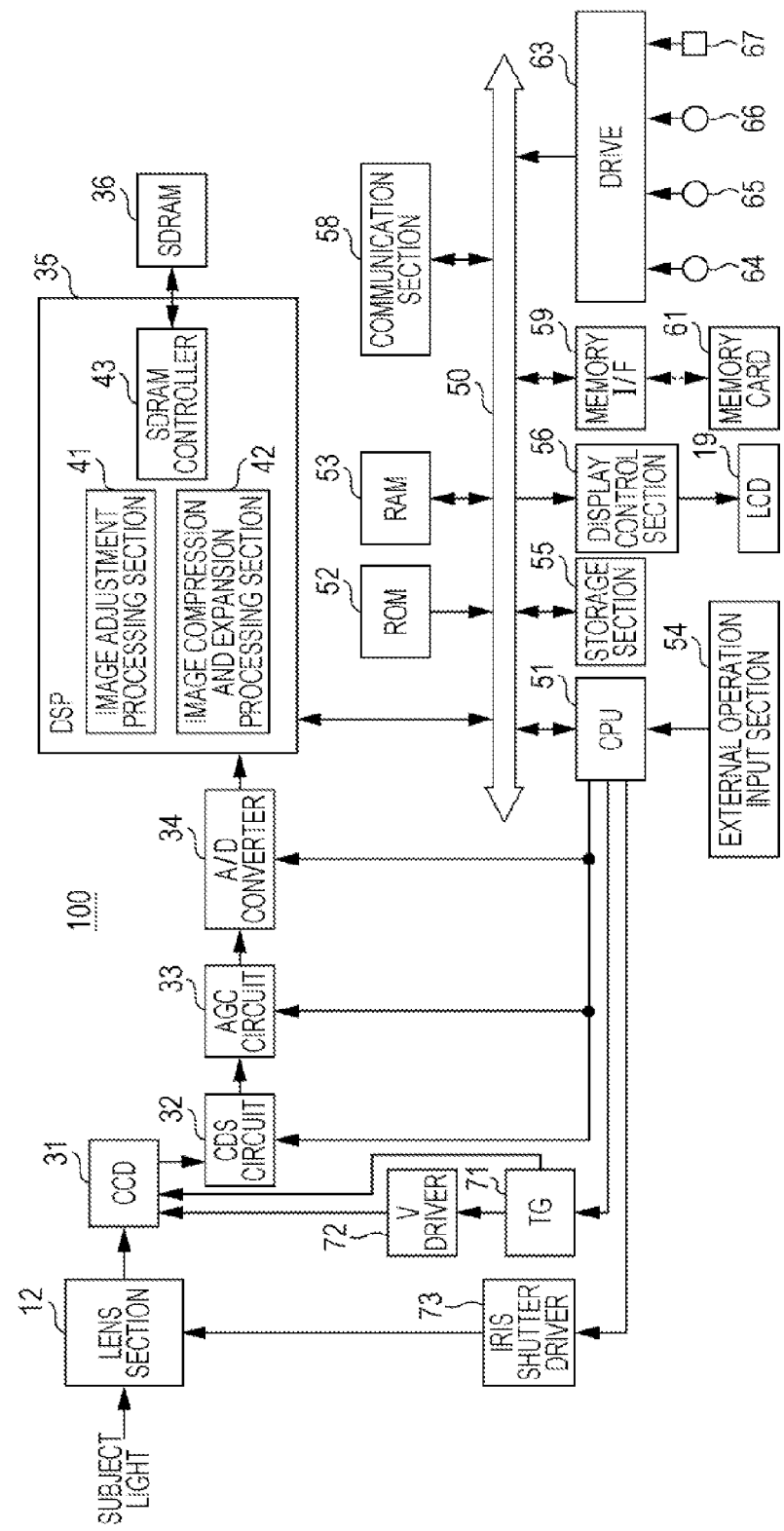
FIG. 1 is a block diagram illustrating an example of a configuration of a camera as an embodiment.

In the following, descriptions will be given of modes for carrying out the present disclosure (hereinafter, referred to as "embodiments"). In this regard, descriptions will be given in the following order.
1. Embodiments
2. Variations 1. Embodiments Example of Configuration of Camera FIG. 1 illustrates an example of a configuration of a camera 100 as an embodiment. First, a description will be given of a basic configuration of the camera 100.

Light from a subject enters a CCD (Charge Coupled Device) 31 as an imaging device through a lens section 12 including a lens, an iris mechanism, and so on, is subjected to photoelectric conversion, and is supplied to a CDS (Correlated Double Sampling) circuit 32 as an imaging signal.

The CDS circuit 32 performs correlated double sampling on the imaging signal to eliminate noise components, and outputs the imaging signal to an AGC (Automatic Gain Control) circuit 33 as image data. The AGC circuit 33 performs gain adjustment of the image data, and then outputs the image data to an A/D converter 34. The A/D converter 34 performs conversion on the image data from an analog signal to a digital signal, and outputs the digital signal to a DSP (Digital Signal Processor) 35.

The DSP 35 includes an image adjustment processing section 41, an image compression and expansion processing section 42, and an SDRAM controller 43. In the DSP 35, the image adjustment processing section 41 generates a control signal to be used for auto focus, auto exposure, and auto white balance, and so on, on the basis of the image data, and supplies the control signals to the CPU 51 through a bus 50.

In the DSP 35, while the SDRAM (Synchronous Dynamic Random Access Memory) controller 43 controls an SDRAM 36, the image compression and expansion processing section 42 compresses the image data by a predetermined compression and expansion method to generate compressed image data. Also, in the DSP 35, the image compression and expansion processing section 42 expands the compressed image data having been supplied to the storage section 55, and so on.

The compressed image data generated by the image compression and expansion processing section 42 is supplied and stored into a RAM 53 through a bus 50, and then is supplied to the storage section 55 to be recorded in a memory, a hard disk, and so on, or is supplied to a memory card 61 connected to a memory I/F 59, or to a communication section 58, and is transferred to an external device including the other cameras.

The CPU 51 controls individual sections in accordance with a program stored in a ROM 52, or a program loaded from a storage section 55 including a flash memory, and so on, to a RAM 53, and performs various kinds of processing. Also, the RAM 53 suitably stores data that is necessary when the CPU 51 performs various kinds of processing, and so on. Also, an external operation input section 54 that receives user's operation is connected to the CPU 51.

The CPU 51, the ROM 52, and the RAM 53 are mutually connected through the bus 50. Also, the storage section 55 including a nonvolatile memory, a hard disk, and so on, a display control section 56 for controlling an image to be displayed on an LCD 19, a memory I/F 59 to which a memory card 61, and so on are attached, are connected to the bus 50.

The display control section 56 stores image data expanded by the DSP 35 into an internal VRAM (Video RAM), and displays an image corresponding to the image data stored in the VRAM and an image corresponding to the image data stored in the other memories onto the LCD 19.

Also, a drive 63 is connected to the bus 50 as necessary through an interface. And a program read from a magnetic disk 64, an optical disc 65, a magneto-optical disc 66, or a memory 67, and so on, which are connected to the drive 63, is installed into the storage section 55, and so on. Also, a program read from the memory card 61 that is suitably attached to the memory I/F 59 is installed into the storage section 55, and so on as necessary.

The CPU 51 controls operation of the CDS circuit 32, the AGC circuit 33, and the A/D converter 34 on the basis of instruction information input from the external operation input section 54 by the user, and control information supplied from the image adjustment processing section 41, or information obtained by executing various programs. Also, the CPU 51 controls a TG (timing generation section) 71 and a V driver 72 that controls driving of the CCD 31 in order to control the operation of the CCD 31. Further, the CPU 51 controls an iris shutter driver 73 that controls operation of the lens section 12 so as to adjust a shutter speed and an iris mechanism.

The communication section 58 performs transmission and reception of various kinds of information including a captured image (image data) with an external device including another camera capable of communication through wireless and wired communication connection under the control of the CPU 51, and so on, for example.

Image Transfer Processing (First Pattern)

A description will be given of an example (first pattern) of image transfer processing in the camera 100 illustrated in FIG. 1. The camera 100 enters an imaging mode or a transfer mode on the basis of the instruction information input from the external operation input section 54 by the user.

In the imaging mode, imaging (a1) and storage (a2) are performed repeatedly as illustrated in FIG. 2A. In this case, every time a subject is shot, an image (image data) obtained by shooting is stored in the image storage section (the storage section 55, the memory card 61, and so on).

In the transfer mode, object selection (b1), object comparison (b2), image collection (b3), and transfer (b4) are performed as illustrated in FIG. 2B. In the object selection (b1), first, a subject including a person face as an object is shot, and the captured image (captured image data) is stored in the RAM 53. And the CPU 51 processes the captured image, selects a person face included in the captured image as an object, and stores the feature quantity thereof (parameter information for face identification) into the RAM 53.

In this case, if the captured image includes a plurality of person faces, the individual person faces are selected as objects, and the feature quantities thereof are stored in the RAM 53. In this regard, when feature quantities that are effective are extracted from a face image, signal processing, such as edge image processing, frequency intensity image processing, advanced auto-correlation processing, color conversion image processing, and so on, for example, are performed unrestrictedly. For example, parameter information representing a feature of a face, such as eyes and a nose, and so on, is extracted as feature quantities of a face image.

In the object comparison (b2), the CPU 51 compares the selected object and the storage images for each of the captured images (the storage images) stored in the image storage section, and identifies whether the storage image includes the object. In this case, the CPU 51 processes the storage images, extracts a person face, calculate a correlation value between the feature quantity thereof and the feature quantity of the selected object, and identifies whether the storage image includes the object or not.

In the image collection (b3), the CPU 51 generates a transfer list of the storage images to be transferred on the basis of an identification result of each of the storage images, and stores the transfer list in the RAM 53. Here, the camera 100 is allowed to perform mode setting indicating an image collection pattern on the basis of instruction information by the user input from the external operation input section 54.

The transfer list generated by the above-described CPU 51 records, for example, storage images including all of or a part of the selected objects, or storage images not including all of the selected objects on the basis of the mode setting. FIGS. 3A and 3B illustrate an example of corresponding relationships between mode settings and image collection patterns, and includes a case of one object and a case of two objects, respectively.

In the case of one object at selection time, "mode1" or "mode2" is set. In the case of being set in "mode1", the storage images including the object are collected. That is to say, in this case, the transfer list records storage images including the object. Also, in the case of being set in "mode2", storage images not including the object are collected. That is to say, in this case, the transfer list records the storage images not including the object.

Also, in the case of two objects at selection time, "mode1", "mode2", or "mode3" is set. In the case of being set in "mode1", the storage images including both of the two objects are collected. That is to say, in this case, the transfer list records the storage images including both of the two objects.

Also, in the case of being set in "mode2", the storage images including at least one of the two objects are collected. That is to say, in this case, the transfer list records the storage images including at least one of the two objects. Also, in the case of being set in "mode3", the storage images including none of the two objects are collected. That is to say, in this case, the transfer list records the storage images including none of the two objects.

In the transfer (b4), the storage images recorded in the transfer list are extracted from the image storage section under the control of the CPU 51, and the communication section 58 transfers the storage images to external devices, such as the other cameras, PCs, a server, and so on, which are transfer destinations. In this regard, as the transfer destination information, for example, an IP address, and so on are recorded in advance.

Figure 4:
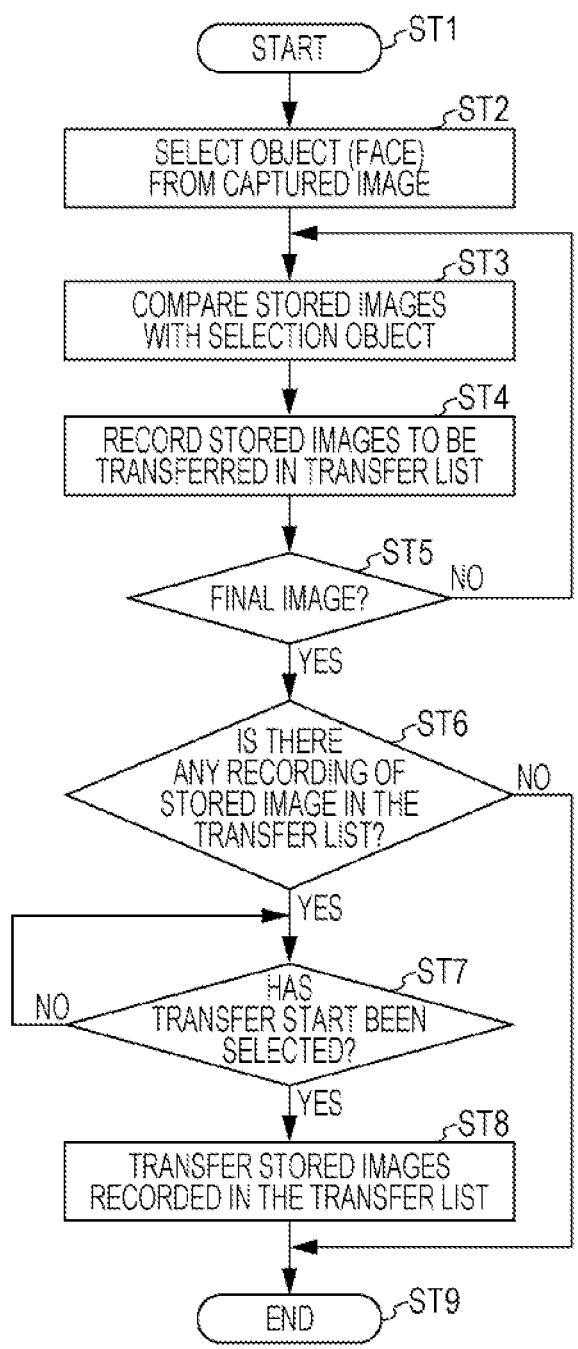
FIG. 4 is a flowchart illustrating an example of control processing in a transfer mode of a CPU in a camera.

A flowchart in FIG. 4 illustrates an example of control processing in the transfer mode (refer to FIG. 2B) of the CPU 51 in the camera 100 illustrated in FIG. 1. For example, when the user performs transfer operation, the CPU 51 starts control processing in the transfer mode in step ST1. And in step ST2, the CPU 51 processes the captured image obtained by the imaging operation by the user, and selects a person face included in the captured image as an object. At this time, the CPU 51 obtains feature quantities (parameter information for face identification) of the object by signal processing, and stores the feature quantities in the RAM 53.

Next, in step ST3, the CPU 51 compares the captured image (storage image) stored in the image storage section with the selection object (face), and identifies whether the selection object is included in the storage images or not. At this time, the CPU 51 processes the storage images, extracts person faces, calculates correlation values between the feature quantities thereof and the feature quantity of the selection object to identify whether the object is included in the storage images or not.

Next, in step ST4, the CPU 51 refers to the identification result in step ST3 on the basis of the number of selection objects and the image collection patterns (refer to FIGS. 3A and 3B) in accordance with the setting mode, and records the storage image compared in step ST3 in the transfer list. Of course, if the identification result in step ST3 does not match the image collection pattern, the storage image compared in step ST3 is not recorded.

Next, in step ST5, the CPU 51 determines whether the processing has been performed on the final image stored in the image storage section or not. If determined that the processing has not been performed on the final image, the CPU 51 returns to step ST3, and performs the same processing as described above on the next storage image. On the other hand, if the processing has not been performed on the final image, the CPU 51 determines whether there is still a storage image recorded in the transfer list in step ST6.

If there is a recorded storage image, the CPU 51 determines whether the user has selected the transfer start or not in step ST7. And when the transfer start has been selected, in step ST8, the CPU 51 controls the communication section 58 in order to transfer the storage images recorded in the transfer list to pre-registered external devices.

In this case, before the user selects the transfer start, the user is allowed to display the storage images recorded in the transfer list on the LCD 19 for confirmation by operation from the external operation input section 54. Also, in this case, the user is allowed to delete a part of or all of the recorded storage images by the operation from the external operation input section 54 as necessary.

After that, the CPU 51 terminates the control processing in step ST9. In this regard, if there are no storage images in the transfer list in step ST6, the CPU 51 directly proceeds to step ST9, and terminates the control processing. Also, although not illustrated in FIG. 4, if the user performs the end operation without selecting the transfer start, or when there are no storage images recorded in the transfer list by delete operation by the user, the CPU 51 directly proceeds to step ST9, and terminates the control processing.

Image Transfer Processing (Second Pattern)

A description will be given of another example (second pattern) of image transfer processing in the camera 100 illustrated in FIG. 1. The camera 100 enters the object recording mode, the imaging mode, or the transfer mode on the basis of the instruction information input by the user from the external operation input section 54.

Figure 5A:
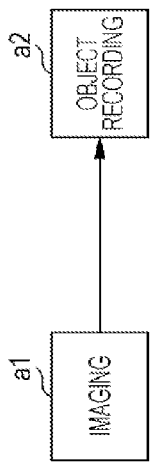
FIGS. 5A, 5B, and 5C are diagrams for illustrating another example (second pattern) of image transfer processing in a camera.
Figure 6:
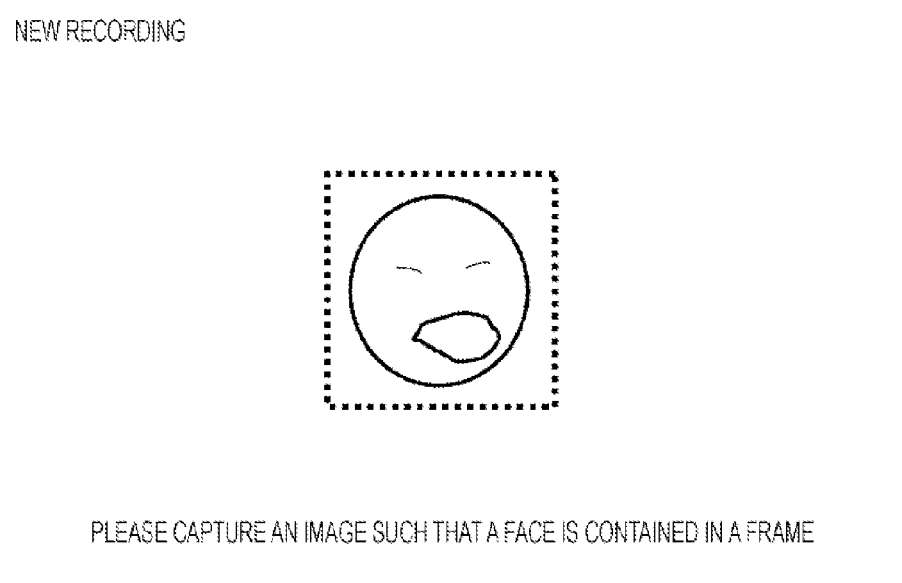
FIG. 6 is a diagram illustrating a display example of an LCD in an object recording mode.

In the object recording mode, as illustrated in FIG. 5A, imaging (a1) and object recording (a2) are carried out. In the imaging (a1), an image of a subject including a person face as an object to be recorded is captured, and the captured image (captured image data) is stored in the RAM 53. FIG. 6 illustrates a display example of the LCD 19 at this imaging time, and the user captures an image so as to fit a face in a frame.

In the object recording (a2), the captured image is processed, a face in the frame is extracted as an object to be recorded, and a face image and the feature quantity (parameter information for face identification) thereof are stored in the storage section 55 in association with each other. The above-described imaging (a1) and object recording (a2) are repeated so that it becomes possible to record a plurality of objects (person faces).

Figure 7:
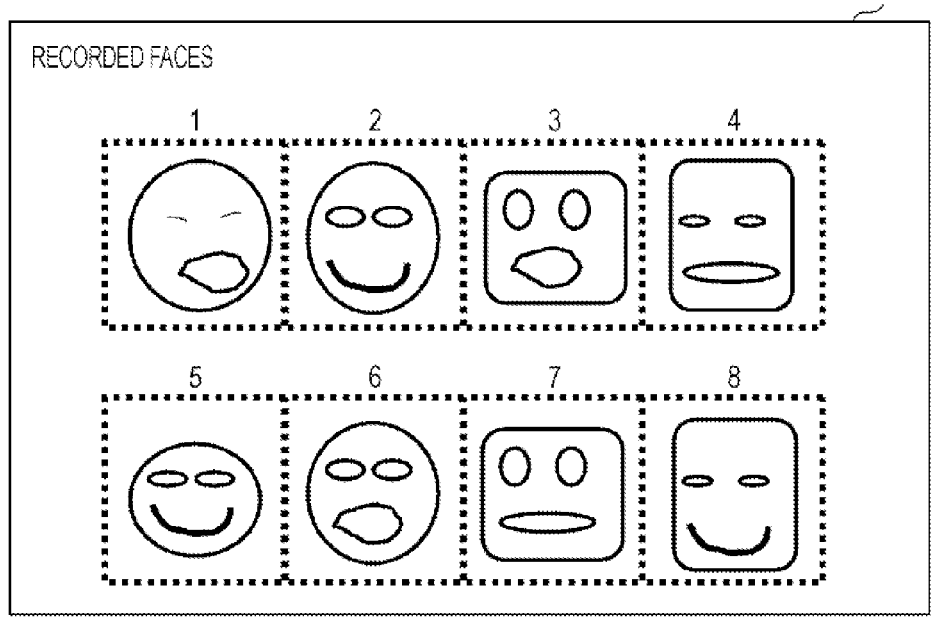
FIG. 7 is a diagram illustrating a display example of an LCD at the time of confirming recorded objects (faces)

The user is allowed to confirm the recorded object (face) by operation of the external operation input section 54. FIG. 7 illustrates a display example of the LCD 19 at confirmation time. An image of the recorded object (face) is displayed, for example for user confirmation as this display example. In this regard, the user is allowed, for example, to selectively exclude an unnecessary object (face) from the recording by operation of the external operation input section 54 at confirmation time.

Figure 5B:
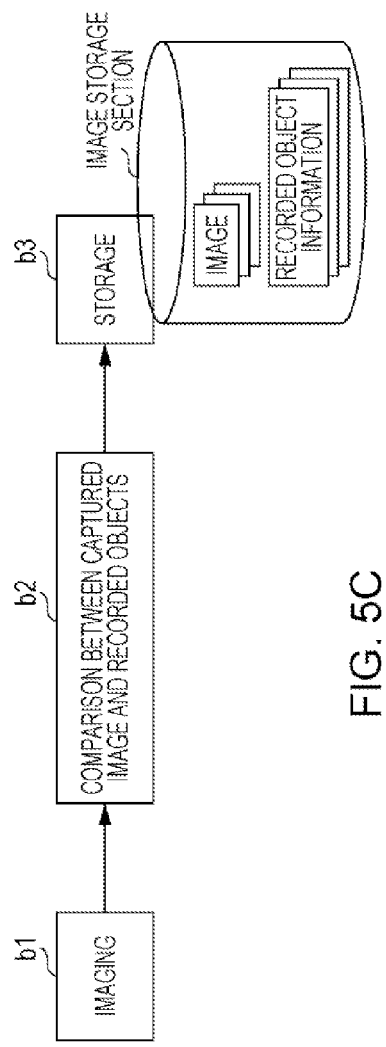

In the imaging mode, as illustrated in FIG. 5B, the imaging (b1), the object comparison (b2), and the storage (b3) are repeatedly carried out. In the imaging (b1), an image of the subject is captured, and the captured image (captured image data) is stored in the RAM 53.

In the object comparison (b2), the captured image is compared with a predetermined number of recorded objects (faces), and identification of whether the captured image includes the object or not is performed. In this case, the CPU 51 processes the captured image, extracts a person face, calculates a correlation value between the feature quantity and the feature quantity of the recorded object, and identifies whether the captured image includes the object or not.

In the storage (b3), the captured images and the identification information (recorded object information) thereof are stored in the image storage section (the storage section 55, the memory card 61, and so on) in association with each other. The identification information in this case indicates which of the recorded objects (faces) is included in the captured image, or none of them is included in the captured image.

Figure 5C:
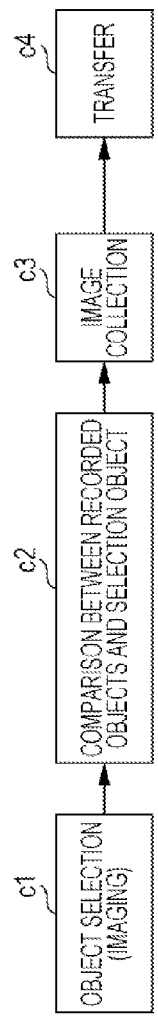

In the transfer mode, as illustrated in FIG. 5C, the object selection (c1), the object comparison (c2), the image collection (c3), and the transfer (c4) are carried out. In the object selection (c1), first, an image of a subject including a person face as an object is captured, and the captured image (captured image data) is stored in the RAM 53.

And the CPU 51 processes the captured image, selects a person face included in the captured image as the object, and stores the feature quantity thereof (parameter information for face identification) into the RAM 53. In this case, if the captured image includes a plurality of person faces, the individual person faces are selected as the objects, and the feature quantities thereof are stored in the RAM 53.

In the object comparison (c2), the CPU 51 compares each of the recorded objects stored in the storage section 55 with the selection object, and identifies whether they match or not. In this case, a correlation value is calculated between the feature quantity of the recorded object and the feature quantity of the selection object, and identification is performed whether they match or not.

In the image collection (c3), the CPU 51 generates a transfer list of the storage images to be transferred on the basis of an identification result of the selection object, and stores the transfer list in the RAM 53. As described above, the captured images (storage images) stored in the image storage section are associated with the identification information (recorded object information) indicating which of the recorded objects (face) is included, or none of the recorded objects is included. Accordingly, it is possible for the CPU 51 to identify whether each of the storage images includes the selection object or not on the basis of the identification information and the identification result of the above-described selection object.

The camera 100 is allowed to perform mode setting indicating an image collection pattern on the basis of instruction information by the user input from the external operation input section 54. The transfer list generated by the above-described CPU 51 records, for example, storage images including all of or a part of the selected objects, or storage images not including all of the selected objects on the basis of the mode setting (refer to FIGS. 3A and 3B).

In the transfer (c4), the storage images recorded in the transfer list are extracted from the image storage section under the control of the CPU 51, and the communication section 58 transfers the storage images to external devices, such as the other cameras, PCs, servers, and so on, which are transfer destinations. In this regard, as the transfer destination information, for example, an IP address, and so on are recorded in advance.

Figure 8:
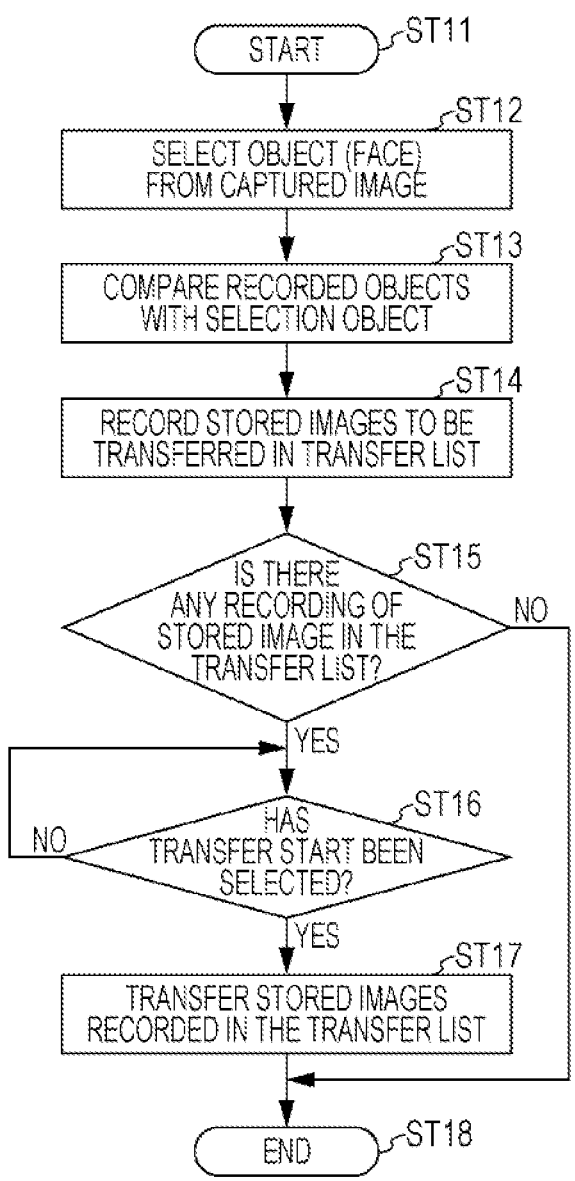
FIG. 8 is a flowchart illustrating an example of control processing in a transfer mode of a CPU in a camera.

A flowchart in FIG. 8 illustrates an example of control processing in the transfer mode (refer to FIG. 5C) of the CPU 51 in the camera 100 illustrated in FIG. 1. For example, when the user performs transfer operation, the CPU 51 starts control processing in the transfer mode in step ST11. And in step ST12, the CPU 51 processes the captured image obtained by the imaging operation by the user, and selects a person face included in the captured image as an object. At this time, the CPU 51 obtains a feature quantity (parameter information for face identification) of the object by the signal processing, and stores the feature quantity in the RAM 53.

Next, in step ST13, the CPU 51 compares the recorded object (face) stored in the storage section 55 with the selection object (face), and identifies whether the selection object matches the recorded object or not. At this time, the CPU 51 calculates a correlation value between the feature quantity of the recorded object and the feature quantity of the selection object, and identifies whether the selection object matches the recorded object.

Next, in step ST14, the CPU 51 collects storage images to be transferred from the storage images stored in the image storage section by referring to the identification result in step ST13 on the basis of the number of selection objects and the image collection pattern (refer to FIGS. 3A and 3B) in accordance with the setting mode in the transfer list, and records the storage images in the transfer list. As described above, the storage images stored in the image storage section are associated with the identification information (recorded object information) indicating which of the recorded objects (faces) is included, or none of the recorded objects is included. Accordingly, in this step, it becomes unnecessary for the CPU 51 to perform processing to compare the storage image and the selection object, and thus processing load is reduced.

Next, in step ST15, the CPU 51 determines whether the transfer list includes recorded storage images or not. If there is a recorded storage image, in step ST16, the CPU 51 determines whether the user has selected the transfer start or not. And when the transfer start is selected, in step ST17, the CPU 51 controls the communication section 58 to transfer the storage images recorded in the transfer list to the external device.

In this case, the user is allowed to display and confirm the storage images recorded in the transfer list on the LCD 19 by operation of the external operation input section 54 before selecting the transfer start. Also, in this case, the user is allowed to delete a part of or all of the recorded storage images by operation of the external operation input section 54 as necessary.

After that, the CPU 51 terminates the control processing in step ST18. In this regard, in step ST15, if there are no storage images recorded in the transfer list, the CPU 51 directly proceeds to step ST18, and terminates the control processing. Also, although not illustrated in FIG. 8, if the user performs the end operation without selecting the transfer start, or when there are no storage images recorded in the transfer list by the delete operation by the user, the CPU 51 directly proceeds to step ST18, and terminates the control processing.

In this regard, in the control processing illustrated by the flowchart in FIG. 8, when there are no storage images recorded in the transfer list in step ST15, the control processing is directly terminated in step ST18. However, at that time, it is thought that a comparison is made between each of the storage images stored in the image storage and the selection object (face), and the transfer list is created again on the basis of the result of the comparison.

Figure 9:
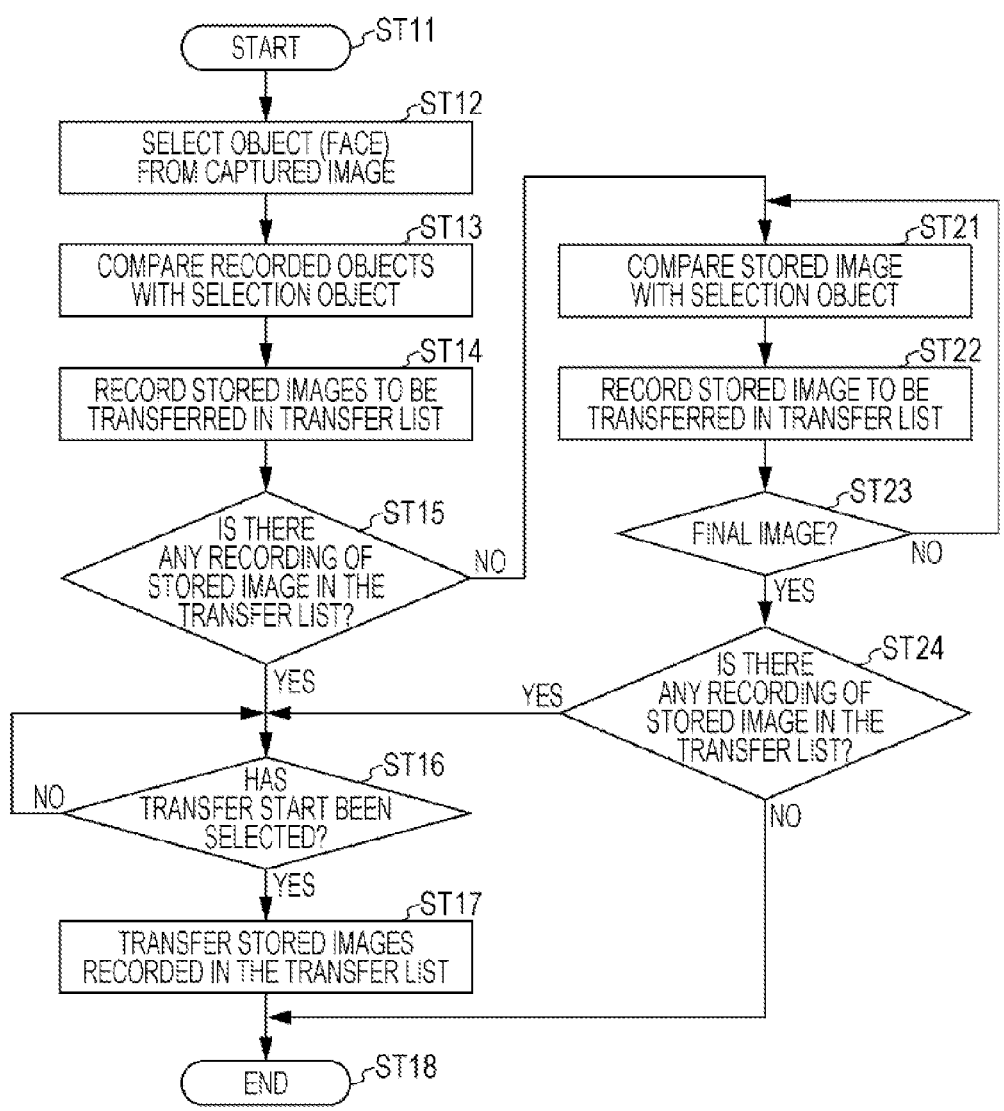
FIG. 9 is a flowchart illustrating an example of control processing in a transfer mode of a CPU in a camera.

A flowchart in FIG. 9 illustrates an example of control processing in the transfer mode of the CPU 51 in that case. In this regard, in FIG. 9, a same symbol is given to a part corresponding to that in FIG. 8, and the detailed description thereof will be suitably omitted.

In step ST15, if there are no storage images recorded in the transfer list, the CPU 51 proceeds to step ST21. In step ST21, the CPU 51 compares the captured image (storage image) stored in the image storage section with the selection object (face), and identifies whether the storage image includes the selection object or not. At this time, the CPU 51 processes the storage image, extracts a person face, and calculates a correlation value between the feature quantity of the person face and the feature quantity of the selection object to identify whether the storage image includes the object or not.

Next, in step ST22, the CPU 51 refers to the identification result in step ST21 on the basis of the number of selection objects and the image collection patterns (refer to FIGS. 3A and 3B) in accordance with the setting mode, and records the storage image compared in step ST21 in the transfer list. Of course, if the identification result in step ST21 does not match the image collection pattern, the storage image compared in step ST21 is not recorded.

Next, in step ST23, the CPU 51 determines whether the processing has been performed on the final image stored in the image storage section or not. If determined that the processing has not been performed on the final image, the CPU 51 returns to step ST21, and performs the same processing as described above on the next storage image. On the other hand, if the processing has not been performed on the final image, the CPU 51 determines whether there is still a storage image recorded in the transfer list in step ST24.

If there is a recorded storage image, the CPU 51 proceeds to step ST16. And if the user has selected the transfer start, in step ST17, the CPU 51 transfers images recorded in the transfer list, and after that, terminates the control processing in step ST18. On the other hand, in step ST24, if there are no storage images in the transfer list, the CPU 51 directly proceeds to step ST18, and terminates the control processing.

As described above, in the camera 100 illustrated in FIG. 1, in the transfer mode, the object (face) is selected from the captured image. And the storage images in accordance with the object are extracted from the image storage section, and are transferred to the external device. In this case, the user ought to capture only an image of a subject including the object, and thus the user operation becomes easy.

2. Variations

In this regard, in the above-described embodiment, an example is illustrated in which after changing into the transfer mode, that is to say, after the user has performed the transfer operation, the user captures an image of the subject including the object (person face), and selects the object from the captured image. However, it is thought that when a transfer operation is performed, the user selects the object from the captured image obtained immediately before this transfer operation is performed. In this case, it is not necessary for the user to perform imaging operation for obtaining captured images for selecting the object after the transfer operation, and thus the processing becomes easy.

Also, in the above-described embodiment, an example in which the object is a person face is illustrated. However, the object in the present technique is not limited to a person face, and may be a face of a dog, a cat, and so on, or the other physical objects.

Also, in the above-described embodiment, an example in which the camera 100 performs all of the image transfer processing. However, it is thought that a part of the processing is performed by an external device (a server, and so on) in a cloud environment, that is to say, an external device connected to a network.

Figure 10:
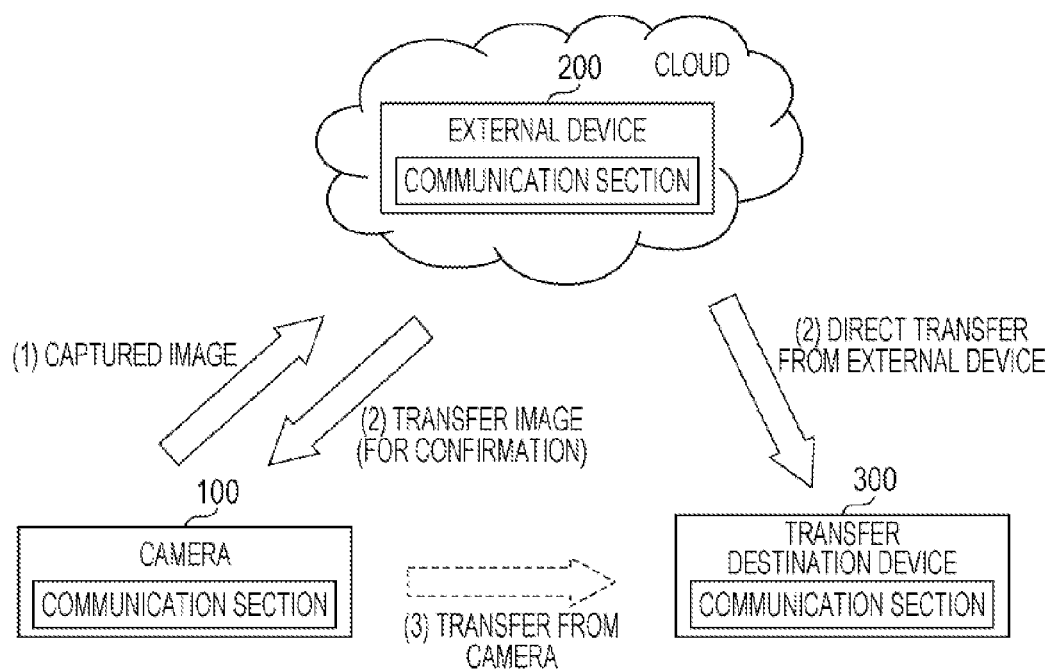
FIG. 10 is a block diagram illustrating an example of a configuration of an image processing system that uses an external device in a cloud environment.

FIG. 10 illustrates an example of a configuration of an image processing system in that case. First, a case where the image transfer processing (first pattern) (refer to FIGS. 2A and 2B) is performed is considered. In this case, a captured image obtained by the camera 100 in the imaging mode is transferred to an external device 200 in a cloud environment, and is stored in the image storage section in the external device 200.

Also, in this case, in the transfer mode, the captured image for selecting an object (face) obtained by the camera 100 is transferred to the external device 200 in the cloud environment. And the external device 200 in the cloud environment performs each processing of object selection, a comparison between the storage images and the selection object, and image collection, and transfer to a transfer destination device 300.

In this regard, in this case, it is thought that the external device 200 in the cloud environment transmits the transfer images to the camera 100. Thereby, it becomes possible to confirm the transfer images on the camera 100. Also, it may be configured such that the external device 200 in the cloud environment does not directly transfer the images to the transfer destination device 300, but transfer the images to the transfer destination device 300 through the camera 100.

Next, consider the case of performing the image transfer processing (second pattern) (refer to FIG. 5C). In this case, in the object recording mode, the captured image for recording the object (face) obtained by the camera 100 is transmitted to the external device 200 in the cloud environment, and the external device 200 performs recording of the object.

Also, in this case, the captured images obtained by the camera 100 in the imaging mode are transferred to the external device 200 in the cloud environment. And the external device 200 compares the captured images with the recorded objects, adds the identification information indicating which of the recorded objects (faces) is included in the captured image or none of the recorded objects, and stores the identification information in the image storage section of the external device 200.

Also, in this case, in the transfer mode, the captured image for selecting the object (face) obtained by the camera 100 is transmitted to the external device 200 in the cloud environment. And in the external device 200 in the cloud environment, each processing of the object selection, the comparison between the recorded object and the selection object, the image collection, and the transfer to the transfer destination device 300 are carried out.

In this regard, in this case, it is thought that the external device 200 in the cloud environment transmits the transfer images to the camera 100. Thereby, it becomes possible for the camera 100 to confirm the transfer images. Also, it may be configured that the external device 200 in the cloud environment does not directly transfer the images to the transfer destination device 300, but transfers the images to the transfer destination device 300 through the camera 100.

In the image processing system having the configuration illustrated in FIG. 10, a part of processing of the image transfer processing is performed by the external device 200 in the cloud environment in place of the camera 100. Accordingly, it becomes possible to reduce processing load of the camera 100, and to save the memory capacity.

Figure 11:
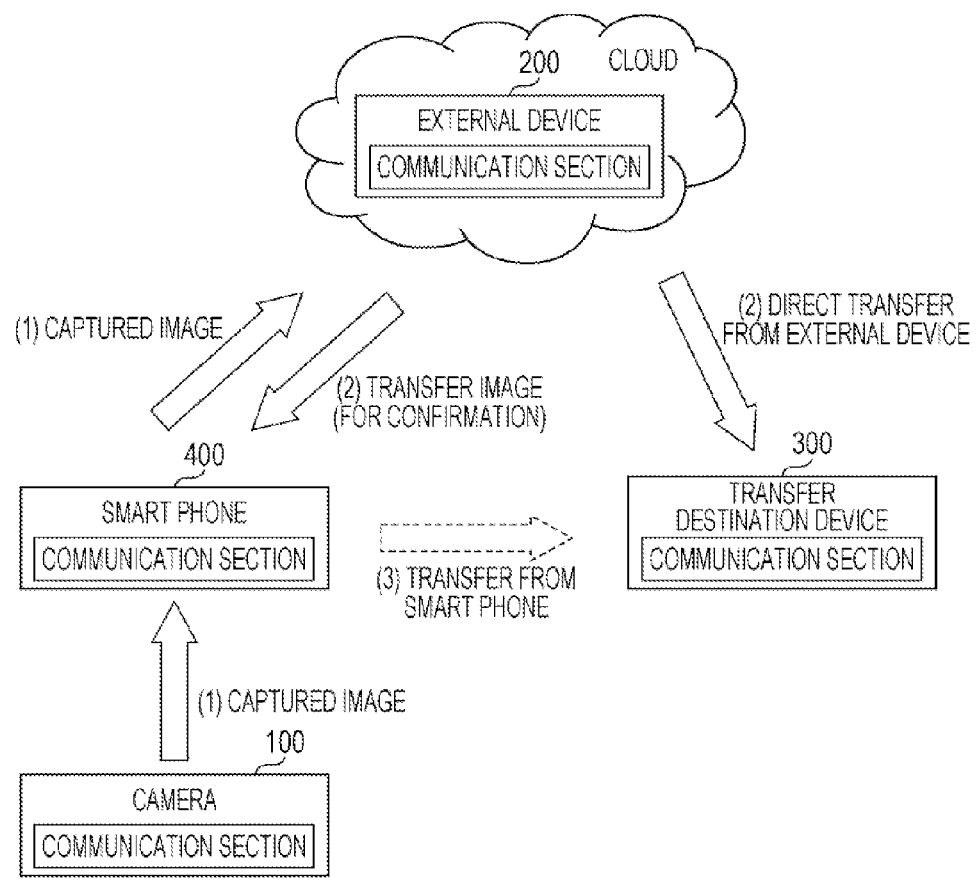
FIG. 11 is a block diagram illustrating another example of a configuration of an image processing system that uses an external device in a cloud environment.

FIG. 11 illustrates an example of a configuration of an image processing system using an external device in a cloud environment in the same manner as FIG. 10. In this example of configuration, the camera 100 does not directly transmit the captured image from the external device 200 in a cloud environment, but a smart phone 400 is inserted as a relay device. In this regard, the part of the smart phone 400 may be the other mobile terminal, and further, a personal computer, and so on.

Also, it is possible to configure the present technique as follows.

(1) An image processing apparatus including:

an imaging section;

an image storage section configured to store a captured image obtained by capturing an image by the imaging section;

an object selection section configured to select an object from the captured image obtained by capturing the image by the imaging section; and an image extraction section configured to extract a captured image in accordance with the object selected from the stored captured image.

(2) The image processing apparatus according to (1), further including an image transfer section configured to transfer the extracted captured image to an external device.

(3) The image processing apparatus according to (2), wherein when a transfer operation is performed, the object selection section is configured to select the object from the captured image obtained by capturing the image by the imaging section immediately before the transfer operation.

(4) The image processing apparatus according to any one of (1) to (3), wherein the image extraction section is configured to extract a captured image including all of or a part of the selected objects, or including none of the selected objects from the stored captured images on the basis of a mode setting.

(5) The image processing apparatus according to any one of (1) to (4), wherein the image extraction section is configured to compare the selected object with the stored captured image, identify whether the object is included in the captured image or not, and extract the captured image in accordance with the selected object from the stored captured images.

(6) The image processing apparatus according to any one of (1) to (4), further including an object recording section configured to record a predetermined number of objects on the basis of the captured image obtained by capturing the image by the imaging section, wherein the image storage section is configured to compare the captured image obtained by capturing the image by the imaging section with the predetermined number of objects recorded, identify whether the captured image includes each object, and store the captured image with identification information, and the image extraction section is configured to compare the selected object with the predetermined number of objects recorded, identify whether the selected object is any one of the predetermined number of objects recorded or whether the selected object is none of the predetermined number of objects recorded, and extract the captured image in accordance with the selected object from the captured images stored with the identification information.

(7) The image processing apparatus according to any one of (1) to (6), wherein the object is a human face.

(8) A method of processing an image, including:

storing a captured image obtained by capturing an image by an imaging section;

selecting an object from the captured image obtained by capturing the image by the imaging section; and extracting a captured image in accordance with the object selected from the stored captured image.

(9) A program for causing a computer to perform a method of processing an image, the method including:

storing a captured image obtained by capturing an image by an imaging section;

selecting an object from the captured image obtained by capturing the image by the imaging section; and extracting a captured image in accordance with the object selected from the stored captured image.

(10) An image processing apparatus including:

an image acquisition section configured to acquire a captured image;

an image storage section configured to store the captured image acquired;

an object selection section configured to select an object from the acquired image; and an image extraction section configured to extract a captured image in accordance with the object selected from the stored captured image.

(11) The image processing apparatus according to (10), wherein the image acquisition section is configured to receive the captured image from an external device through a network.

(12) The image processing apparatus according to (10) or (11), further including an image transfer section configured to transfer the extracted captured image to an external device.

(13) An image processing apparatus including:

an image acquisition section configured to acquire a captured image;

an object recording section configured to record a predetermined number of objects on the basis of the captured image acquired; and an image storage section configured to compare the captured image acquired with the predetermined number of objects recorded, identify whether the captured image includes each object, and store the captured image with identification information.

The present disclosure contains subject matter related to that disclosed in Japanese Priority Patent Application JP 2012-196682 filed in the Japan Patent Office on Sep. 6, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:

one or more processors to (i) select an input object from an input image so as to extract feature parameter information from the input object, (ii) compare the input object with a plurality of preregistered objects using the feature parameter information so as to determine an output object among the plurality of preregistered objects based on a comparison result therefrom, wherein each of the plurality of preregistered objects is recorded prior to the selection of the input object, and (iii) extract an output image from a plurality of preregistered images in which the output object is present, using a plurality of object information, wherein each of the plurality of object information is associated with each of the plurality of preregistered images and each of the plurality of object information contains object identification information which indicates whether or not none or one or more objects among the plurality of preregistered objects are present in a corresponding preregistered image among the plurality of preregistered images and, when the one or more objects are present in the corresponding preregistered image, the object identification information identifies the one or more objects.

2. The image processing apparatus according to claim 1, in which during operation the one or more processors control a transfer of the output image to an external device.

3. The image processing apparatus according to claim 2, wherein the input image is one of the plurality of preregistered images.

4. The image processing apparatus according to claim 1, wherein during operation the one or more processors extract the output image including all of or a part of the input object, or including none of the input object from the plurality of preregistered images on the basis of a mode setting.

5. The image processing apparatus according to claim 1, further comprising an imaging device to capture the input image.

6. The image processing apparatus according to claim 1, further comprising a recording device to record a plurality of preregistered objects on the basis of the input image obtained by capturing an image by an imaging device.

7. The image processing apparatus according to claim 1, wherein the input object is a human face.

8. A method of processing an image for use by an image processing apparatus having one or more processors, said method comprising:
 selecting an input object from an input image so as to extract feature parameter information from the input object;
 comparing the input object with a plurality of preregistered objects using the feature parameter information so as to determine an output object among the plurality of preregistered objects based on a comparison result therefrom, wherein each of the plurality of preregistered objects is recorded prior to the selection of the input object; and
 extracting an output image from a plurality of preregistered images, in which the output object is present, using a plurality of object information,
 wherein each of the plurality of object information is associated with each of the plurality of preregistered images and each of the plurality of object information contains object identification information which indicates whether or not none or one or more objects among the plurality of preregistered objects are present in a corresponding preregistered image among the plurality of preregistered images, and, when the one or more objects are present in the corresponding preregistered image, the object identification information identifies the one or more objects, and
 at least one of said selecting, said comparing, or said extracting being performed by said one or more processors.

9. A non-transitory computer readable medium having stored thereon a program for causing a computer to perform a method of processing an image, the method comprising:
 selecting an input object from an input image so as to extract feature parameter information from the input object;
 comparing the input object with a plurality of preregistered objects using the feature parameter information so as to determine an output object among the plurality of preregistered objects based on a comparison result therefrom, wherein each of the plurality of preregistered objects is recorded prior to the selection of the input object; and
 extracting an output image from a plurality of preregistered images, in which the output object is present, using a plurality of object information,
 wherein each of the plurality of object information is associated with each of the plurality of preregistered images and each of the plurality of object information contains object identification information which indicates whether or not none or one or more objects among the plurality of preregistered objects are present in a corresponding preregistered image among the plurality of preregistered images and, when the one or more objects are present in the corresponding preregistered image, the object identification information identifies the one or more objects.

10. The image processing apparatus according to claim 1, wherein the input image is received from an external device through a network.

11. The image processing apparatus according to claim 1, wherein an object is registered as one of the plurality of preregistered objects by capturing an object registering image such that the object is present in the object registering image.

12. The image processing apparatus according to claim 1, wherein one of the plurality of object information is associated with an image, in response to recording the image as one of the plurality of preregistered images.

13. The image processing apparatus according to claim 1, wherein an object among the plurality of preregistered objects is unregistered based on a user operation.

* * * * *